(12) United States Patent
Hoffman

(10) Patent No.: US 11,001,445 B2
(45) Date of Patent: May 11, 2021

(54) MOBILE LIGHTED PICK OR PUT CART AND METHOD OF USE

(71) Applicant: Dematic Corp., Grand Rapids, MI (US)

(72) Inventor: Stephen E. Hoffman, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 108 days.

(21) Appl. No.: 15/992,998

(22) Filed: May 30, 2018

(65) Prior Publication Data

US 2018/0354719 A1 Dec. 13, 2018

Related U.S. Application Data

(60) Provisional application No. 62/516,429, filed on Jun. 7, 2017.

(51) Int. Cl.
*B65G 1/10* (2006.01)
*G06Q 10/08* (2012.01)
(Continued)

(52) U.S. Cl.
CPC ............. *B65G 1/10* (2013.01); *B65G 1/1373* (2013.01); *B65G 1/1375* (2013.01); *G06Q 10/08* (2013.01);
(Continued)

(58) Field of Classification Search
CPC ....................................................... B65G 1/10
See application file for complete search history.

(56) References Cited

U.S. PATENT DOCUMENTS 5,767,532 A * 6/1998 Nishiguchi .......... B65G 1/1371
340/8.1
5,805,456 A * 9/1998 Higham .............. G07F 17/0092
700/236

(Continued)

FOREIGN PATENT DOCUMENTS

| ES | 2349612 A1 | 1/2011 |
|----|------------|--------|
| JP | S63306103 A | 12/1988 |
| WO | 0105686 A2 | 1/2001 |

OTHER PUBLICATIONS

Integrated, "Order fulfillment systems" (Brochure EN), Mar. 2017.
(Continued)

*Primary Examiner* — Thien M Le
*Assistant Examiner* — Asifa Habib
(74) *Attorney, Agent, or Firm* — Gardner, Linn, Burkhart & Ondersma LLP

(57) ABSTRACT

A mobile lighted pick or put cart includes a frame and transport members on the frame that facilitate movement of the frame. The frame defines a plurality of vertically spaced shelves. An electronic system supported with the frame includes a portable computing device and a plurality of lamp strips, one mounted to each of the shelves. An application program that is operated by the portable computing device is adapted to determine a quantity of items to be picked from or put to a physical location and illuminate a number of individual lamps on one of the strips at a particular location on one of said shelves. The number of individual lamps illuminated is equal to the quantity of items to be picked from or put to the physical location.

21 Claims, 3 Drawing Sheets

(51) Int. Cl.
B65G 1/137 (2006.01)
B65G 1/04 (2006.01)

(52) U.S. Cl.
CPC ........ *B65G 1/0492* (2013.01); *B65G 2209/04* (2013.01)

(56) References Cited

U.S. PATENT DOCUMENTS

| | | | | |
|---|---|---|---|---|
| 5,905,653 | A * | 5/1999 | Higham | G16H 20/13 700/244 |
| 6,039,467 | A | 3/2000 | Holmes | |
| 6,711,458 | B1 * | 3/2004 | Kofoed | |
| 7,077,286 | B2 * | 7/2006 | Shows | G07F 11/62 221/92 |
| 7,766,242 | B2 * | 8/2010 | Lunak | B65G 1/12 235/462.45 |
| 8,979,296 | B2 * | 3/2015 | Wiemer | A47F 5/103 362/125 |
| 9,157,617 | B1 | 10/2015 | Williams et al. | |
| 9,262,741 | B1 | 2/2016 | Williams et al. | |
| 9,327,397 | B1 | 5/2016 | Williams et al. | |
| 10,140,895 | B2 * | 11/2018 | Jones | G09F 13/22 |
| 10,147,070 | B1 * | 12/2018 | Tate | G06Q 10/087 |
| 2004/0153207 | A1 | 8/2004 | Peck | |
| 2004/0193315 | A1 * | 9/2004 | Lunak | B65G 1/12 700/243 |
| 2005/0006569 | A1 | 1/2005 | Yoshiyuki | |
| 2005/0113970 | A1 * | 5/2005 | Holmes | A47B 88/00 700/242 |
| 2008/0183328 | A1 * | 7/2008 | Danelski | G06Q 50/30 700/216 |
| 2009/0210247 | A1 | 8/2009 | Chudy et al. | |
| 2014/0114875 | A1 * | 4/2014 | Murthy | G07C 9/00912 705/339 |
| 2015/0081088 | A1 * | 3/2015 | Lyon | G06Q 10/0875 700/216 |
| 2015/0186765 | A1 | 7/2015 | Osborne | |
| 2015/0210199 | A1 * | 7/2015 | Payne | G06Q 10/08 701/1 |
| 2016/0189087 | A1 * | 6/2016 | Morton | G06Q 10/083 705/337 |
| 2016/0300179 | A1 | 10/2016 | Aviles | |
| 2017/0015502 | A1 * | 1/2017 | Engel | B65G 1/065 |
| 2017/0088355 | A1 | 3/2017 | Khodl et al. | |
| 2017/0140329 | A1 * | 5/2017 | Bernhardt | B65G 1/1371 |
| 2019/0152376 | A1 * | 5/2019 | Schwartz | G06Q 10/087 |
| 2019/0291954 | A1 * | 9/2019 | Lee | B65G 1/137 |

OTHER PUBLICATIONS

International Search Report and Written Opinion of the International Searching Authority from corresponding Patent Cooperation Treaty (PCT) Application No. PCT/IB2018/53863, indicated completed on Sep. 25, 2018.

* cited by examiner

MOBILE LIGHTED PICK OR PUT CART AND METHOD OF USE

CROSS REFERENCE TO RELATED APPLICATIONS

This application claims priority from U.S. patent application Ser. No. 62/516,429, filed on Jun. 7, 2017, the disclosure of which is hereby incorporated herein by reference in its entirety.

BACKGROUND OF THE INVENTION

The present invention is directed to order fulfillment and, in particular to fulfilling orders involving directing picking of items by an individual from an inventory area or putting of items from a mobile cart to an inventory area. While the invention is useful in a warehouse distribution environment, it may also find use in a retail environment for direct-to consumer order fulfillment as well as other applications.

It is known to use a mobile lighted pick or put cart to either pick inventory items from an inventory area to receptacles on the mobile cart or to put items from receptacles on the mobile cart to an inventory area. Such mobile carts have utilized seven-segment digital readouts in order to provide information to an operator as to how many items to pick from or put to an inventory area, and which receptacle on the cart to put the items to or pick the items from. Such known lighted mobile carts have required excessive power supply, such as from a lead-acid battery, and are heavy and therefore require more operator effort to move about. Also, known lighted mobile carts require significant operator training in order to understand the various operations being indicated by the digital readout. Also, in order to accommodate different sized receptacles it is necessary to reconfigure the cart by moving the digital readout to coincide with receptacle spacing.

SUMMARY OF THE INVENTION

A mobile lighted pick or put cart, according to an aspect of the invention, includes a frame and transport members on the frame that facilitate movement of the frame. The frame defines a plurality of vertically spaced shelves. An electronic system supported with the frame includes a portable computing device and a plurality of lamp strips, one mounted to each of the shelves. An application program that is operated by the portable computing device is adapted to determine a quantity of items to be picked from or put to a physical location and illuminate a number of individual lamps on one of the strips at a particular location on one of said shelves. The number of individual lamps illuminated is equal to the quantity of items to be picked from or put to the physical location.

The lamps may be powered directly from a bus connected with the portable computing device. The lamp strips may be light emitting diode strips with the light emitting diodes in a strip being individually addressable. A serial bus may connect the lamp strips with the portable computing device. The serial bus may be a Universal Serial Bus (USB). An optical scanner may be connected with the bus. The portable computer device may be a smart phone, a laptop computer, or a tablet computer.

An order management system may provide data to the application program of items to pick or put, physical locations of those items and/or a quantity of each of the items to pick or put. The portable computer device may receive data from the order management system over a wireless network, or via QR codes that are scanned by the optical scanner. The application program may be configured to illuminate lamps in groups of lamps, wherein each group of lamps defines a physical location on a shelf corresponding to a receptacle location. Different groups of lamps may be illuminated in different colors. The application program may be adapted to illuminate lamps in either a flashing mode or an alternate color mode to indicate a special handling mode, and wherein a basis for the special handling mode is displayed by the portable computer device. A special handling mode may be hazardous material, material being picked or put as part of a random quality control audit, gift wrapping required and/or need to obtain an access code for use with an electronic device requiring the access code.

A method of picking items from an inventory area or putting items to an inventory area, according to an aspect of the invention, includes moving a frame having transport members in an inventory area. The frame defines a plurality of vertically spaced shelves and has an electronic system comprising a portable computing device and a plurality of lamp strips, one mounted to each of the shelves. An application program operated by the portable computing device determines a quantity of items to be picked from or put to a physical location and causes the computing device to illuminate a number of individual lamps on one of the strips at a particular location on one of the shelves. The number of individual lamps illuminated is equal to the quantity of items to be picked from or put to the physical location. The application program causes the computing device to illuminate lamps in groups of lamps and wherein said application program causes said computing device to adjustably position at least one said group of lamps. In this manner the adjustable groups of lamps may be used to vary spacing, and hence size, of receptacles.

The application program may cause the portable computing device to illuminate different groups of lamps in different colors. The application program may cause the portable computing device to illuminate lamps in either a flashing mode or an alternate color mode, to indicate a special handling mode and causes a basis for the special handling mode to be displayed by the portable computer device. The special handling mode may be hazardous material, material being picked or put as part of a random quality control audit, gift wrapping required or need to obtain an access code for use with an electronic device requiring the access code.

These and other objects, advantages and features of this invention will become apparent upon review of the following specification in conjunction with the drawings.

DETAILED DESCRIPTION OF THE PREFERRED EMBODIMENT

Figure 1:
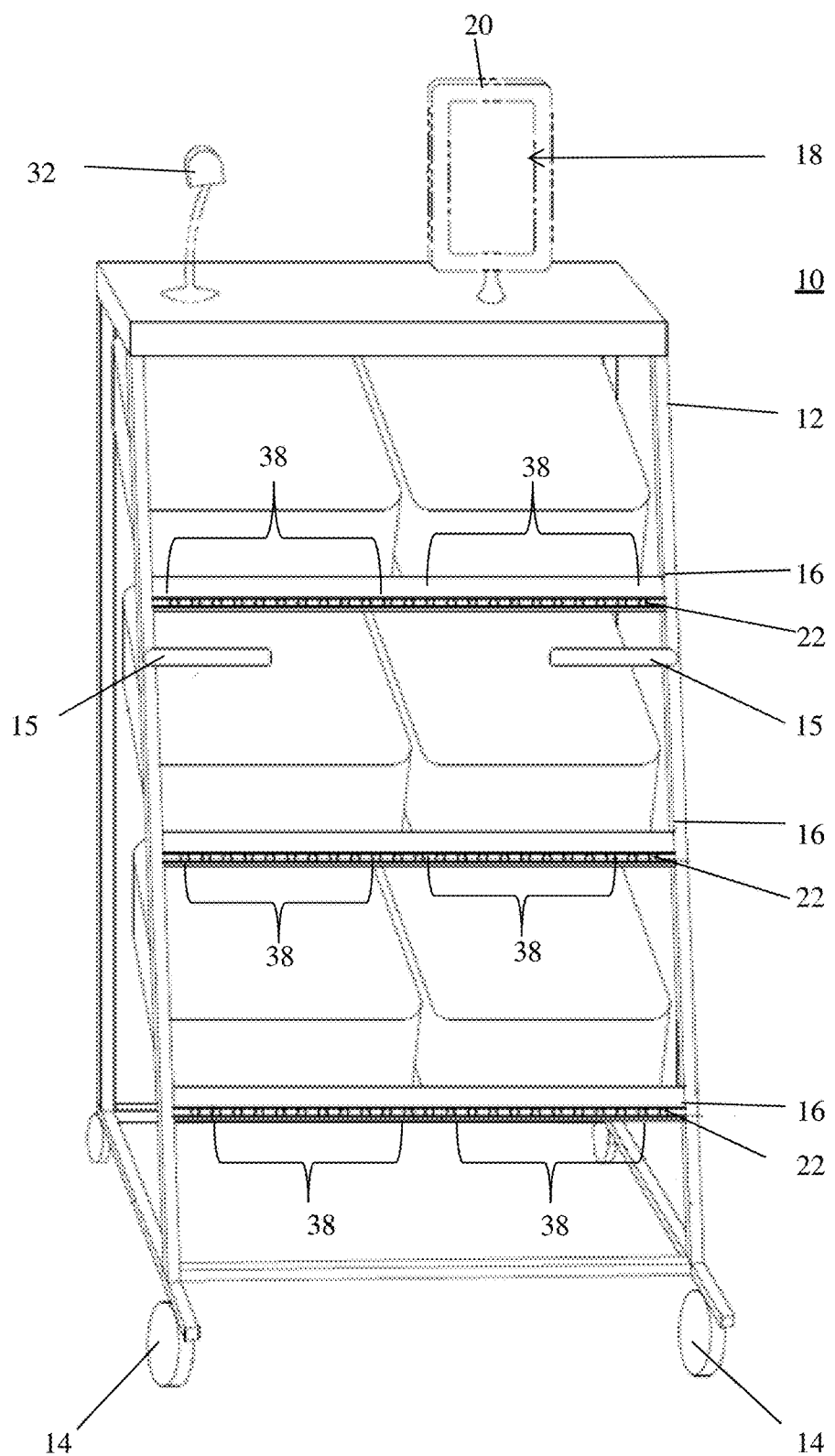
FIG. 1 is a perspective view of a mobile lighted pick or put cart according to an embodiment of the invention.

Referring now to the drawings and the illustrative embodiment depicted therein, a pick or put cart 10 includes a frame 12 and a plurality of transport members 14 (FIG. 1). In the illustrated embodiment, the transport members 14 are casters that propel the cart in response to an operator exerting force on a handle 15. However, the transport members may be motor operated wheels that are part of an automated guided vehicle of the type disclosed in commonly assigned U.S. Pat. No. 9,550,624, entitled AUTONOMOUS MOBILE PICKING, the disclosure of which is hereby incorporated herein by reference in its entity.

Frame 12 is a unitary metallic member defining a plurality of vertically spaced shelves 16. Shelves 16 are sized to support receptacles that can be totes, trays, boxes, shipping containers, or the like. In the illustrated embodiment, the shelves are not divided into compartments so that a variety of different receptacle types and sizes may be supported.

Figure 2:
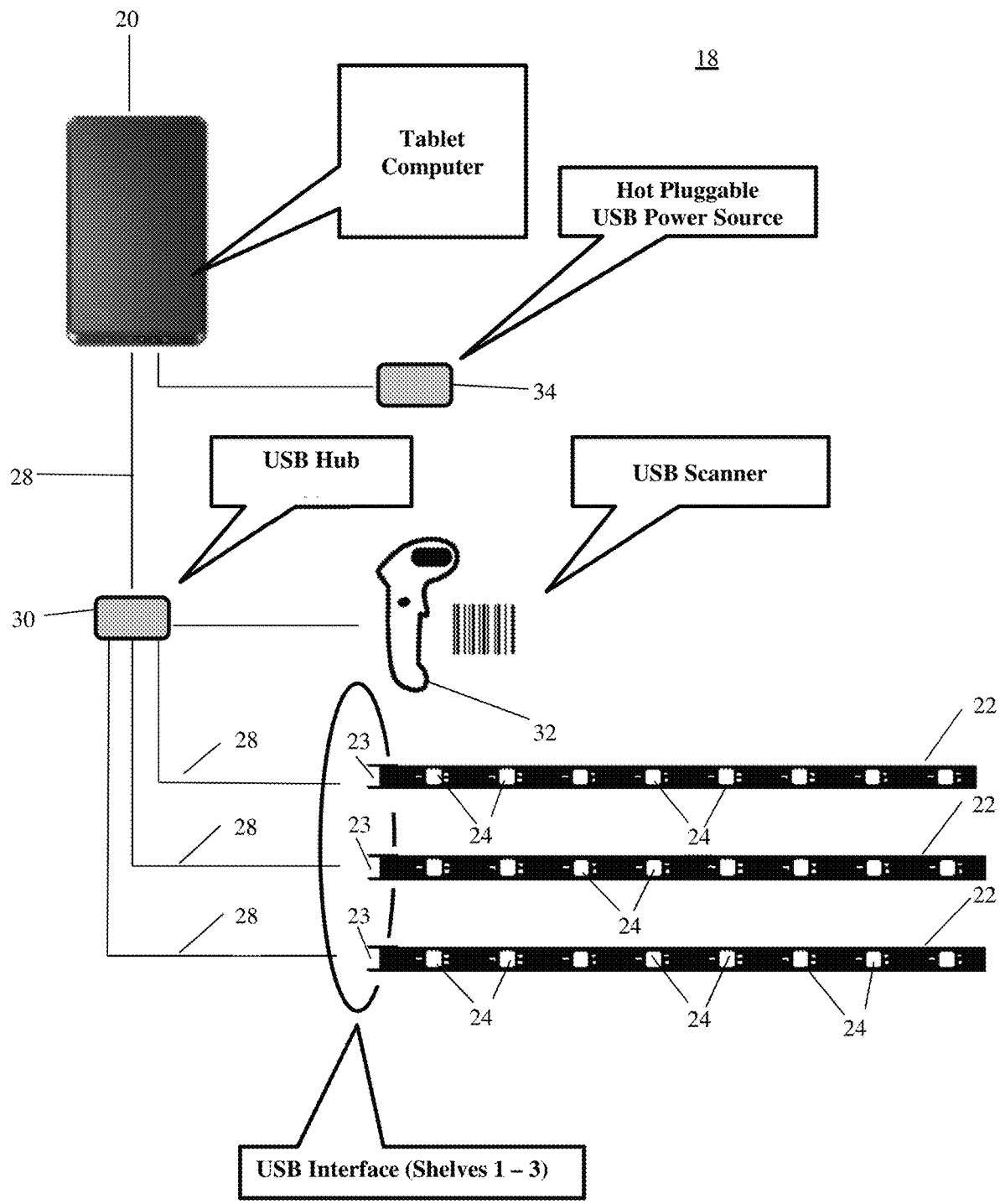
FIG. 2 is an electrical block diagram of an electronic system.

An electronic system 18 is supported with frame 12 (FIG. 2). The electronic system includes a portable computing device 20 and a plurality of lamp strips 22. A portable computer device may be a smart phone, a laptop computer, a tablet computer, or the like. One lamp strip is mounted at a front portion of each shelf. Lamp strips 22 are strips of light emitting diodes that are individually addressable using a BUS driver on interface circuit 23 for each strip. The BUS driver is based on a serial bus protocol such as Universal Serial Bus (USB). In the illustrated embodiment, lamp strips 22 are marketed under the BlinkStick Flex brand by Agile Innovative Ltd, although they are available from multiple sources. As will be observed in FIG. 1, the individual LED lamps are arranged linearly along the front of the shelf in a linear layout. A serial bus 28 connects each lamp strip 22 with a bus hub or switch 30. Portable computing device 20 is also connected with hub 30. An application program 36 is operated by portable computing device 20. Application program 36 determines a quantity of items to be picked from or put to a physical location in a warehouse and illuminates a number of individual lamps 24 on one of strips 22 at a particular linear position on one of shelves 16. The number of individual lamps 24 illuminated by computing device 20 is equal to the quantity of items to be picked from or put to the physical location. As the picker picks or puts the items, this action is indicated on a touch screen of computing device 20 by the operator, and computing device 20 extinguishes the same number of lamps 24, so that the remaining illuminated lamps 24 indicate the number of items remaining to be picked or put. Thus, the operator interface is greatly simplified. If a large quantity of items are to be picked or put, application program 36 may enter a chop-up mode. In the chop-up mode, the total number of items are broken up into a series of multiple reaches so that each time a group of items are picked or put a new series of lamps are illuminated. The number of items in each group may be varied in order to avoid repetition trance on behalf of the operator. In the illustrated embodiment, application program 36 may be provided using open-source software such as Python Software, or the like.

LEDs 24 are powered directly from bus 25 which is connected with portable computing device 20. An optional bus power source 34 can be used to extend the period between need for charging the interval battery of computing device 20. An optical scanner 32 may be connected with hub 30 in order to read optical codes such as bar codes, QR codes, and the like into computing device 20.

An order management system (not shown) can be provided to process customer orders using conventional techniques into data defining picking instructions to be carried out by an operator using cart 10. Such data that is provided to application program 36 may include identity of items to pick or put, physical locations of those items and a quantity of each of the items to pick or put. Portable computer device 20 may receive data from the order management system over a wireless network such as a wide area fidelity (WIFI) network using built-in capability of device 20. Alternatively, portable computer device 20 may receive data from the order management system via QR codes that are scanned by optical scanner 32 using the principles disclosed in commonly assigned U.S. Pat. No. 9,613,334, entitled MOBILE PICKING METHOD, the disclosure of which is incorporated herein by reference.

Application program 36 is configured to illuminate lamps 24 in groups of lamps 38. Each group of lamps 38 defines a physical location on a shelf corresponding to a receptacle. Thus, the first lamp of each group of lamps may define a location on the shelf to coincide with, for example, the left most edge of a receptacle. Thus, the group of lamps defines the location and width of the receptacle that is associated with that receptacle. Alternatively, the group of lamps may indicate an edge of each receptacle so that there could be a buffer of unused lamps between groups of lamps for wide receptacles. In this manner, the operator may be able to pick to or put from a variety of different receptacle sizes which will allow the operator to, for example, pick to or put from shipping containers. Different groups of lamps 38 may be designated by being illuminated in different colors. Thus, one group may be green, the adjacent ones blue, and the like.

Application program 36 may illuminate LEDs 24 in either a flashing mode or an alternate color mode to indicate a special handling mode. The alternate color may be, for example, the color red or orange in order indicate the special handling mode. The basis for the special handling mode is concurrently displayed by the portable computer device. A special handling mode may be a hazardous material warning. It may be that material being picked or put as part of a random quality control audit that will need to be handled differently. It may be that gift wrapping of the item(s) is required. A special handling mode may be needed to obtain an access code for use with an electronic device requiring the access code, such as a smart phone, computer, or the like.

Figure 3:
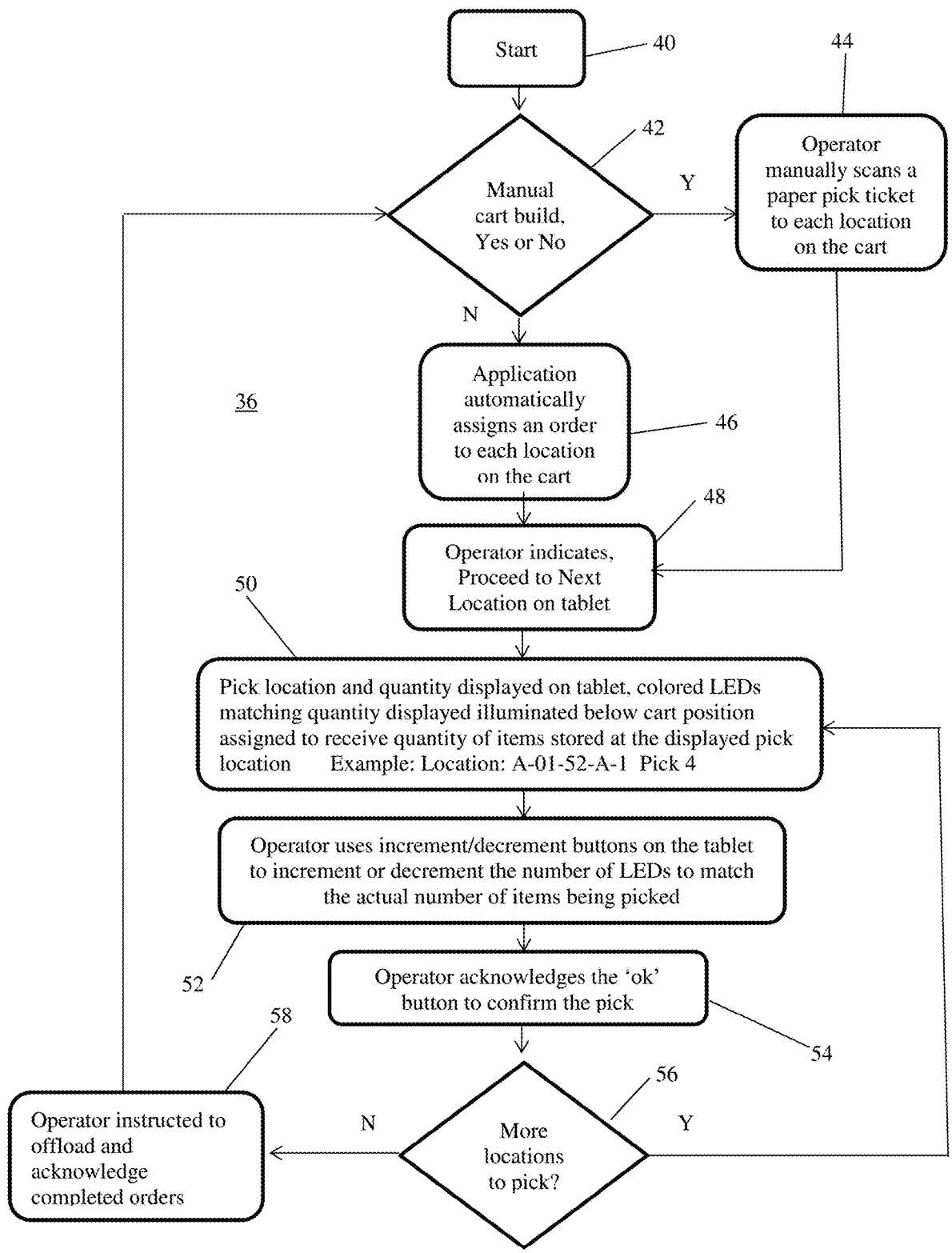
FIG. 3 is a flow diagram of a process carried out by the application program run by the portable computing device by the electronic system in FIG. 2.

Application program 36 begins at 40 by determining at 42 whether the cart build is set to manual or automatic (FIG. 3). If manual, then the operator manually scans a paper ticket at 44, representing an order, and a bar code associated with a receptacle located on cart 10. This is repeated for each receptacle on cart 10. If not manual, then program 36 automatically assigns 46 an order at each location on cart 10. The operator begins picking or putting at 48 by indexing program 36 to the next location to be displayed at 48 on the touch screen of portable computing device 20.

The pick or put location is displayed at 50 on the touch screen of computing device 20 including the quantity to be picked or put and the number of LEDs 24 corresponding to this quantity are illuminated below the position on cart 10 assigned to receive that quantity of items. Also, the physical location in the warehouse is displayed on the portable computing device touch screen. As the operator picks or puts the quantity of items from or to the warehouse location, soft buttons on the touch screen or hard buttons on device 20 are actuated, and the number of illuminated LEDs are changed to match the actual number of items picked or put. Alternatively or in addition, the operator can be prompted to scan a bar code at the location in the warehouse or on the items being picked or put using scanner 32. When the pick or put is complete and the LEDs all off, the operation acknowledges at 54 the completion on the touchscreen of device 20. Also, any shortages can be reported on the touchscreen. It is then determined at 56 if more locations in the warehouse are to be picked. If so, the operator is directed to the next location at 48 and 50. If it is determined at 56 that all warehouse locations have been picked, the operator is instructed at 58 to offload the picked receptacles and acknowledge completed orders.

Thus, it is seen that the invention is embodied in a lighted mobile pick or put cart that is light weight, energy efficient, and easy to use. While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A mobile lighted pick or put cart, comprising:
   a frame and transport members on said frame that facilitate movement of said frame, said frame defining a plurality of vertically spaced shelves;
   an electronic system supported with said frame, said electronic system comprising a portable computing device and a plurality of lamp strips, one of said lamp strips mounted to each of said shelves, each of said lamp strips comprising a plurality of individual lamps immovably fixed in spaced arrangement to said lamp strip; and
   an application program operated by said portable computing device, said application program adapted to determine a quantity of a plurality of items to be picked from or put to a physical location and illuminate a number of individual lamps on a respective one of said strips at the physical location on one of said shelves that requires a pick or put in a manner that the number of illuminated lamps define at least a portion of the physical location, the number of individual lamps illuminated being equal to the quantity of the plurality of items to be picked from or put to the physical location;
   wherein when an operator picks items from the physical location or puts items to the physical location, said application program is adapted to extinguish the same number of lamps as the quantity of items picked from or put to the physical location such that the remaining illuminated lamps are equal to the quantity of items remaining to be picked from or put to the physical location.

2. The pick or put cart as claimed in claim 1 wherein said lamp strips are powered directly from a bus connected with said portable computing device.

3. The pick or put cart as claimed in claim 2 wherein said lamp strips are light emitting diode strips and wherein the light emitting diodes in a strip are individually addressable.

4. The pick or put cart as claimed in claim 2 wherein said bus comprises a serial bus connecting said lamp strips with said portable computing device.

5. The pick or put cart as claimed in claim 4 wherein said serial bus comprises a universal serial bus.

6. The pick or put cart as claimed in claim 2 including an optical scanner connected with said bus.

7. The pick or put cart as claimed in claim 1 including an order management system, said order management system providing data to said application program of items to pick or put, physical locations of those items, and a quantity of each of the items to pick or put.

8. The pick or put cart as claimed in claim 7 wherein said portable computing device receives data from said order management system over a wireless network.

9. The pick or put cart as claimed in claim 7 wherein said portable computing device receives data from said order management system via QR codes that are scanned by an optical scanner connected with said portable computing device.

10. A mobile lighted pick or put cart, comprising:
    a frame and transport members on the frame that facilitate movement of the frame, said frame defining a plurality of vertically spaced shelves;
    an electronic system supported with said frame, said electronic system comprising a portable computing device and a plurality of lamp strips, one of said lamp strips mounted to each of said shelves, each of said lamp strips comprising a plurality of individual lamps immovably fixed in spaced arrangement to said lamp strip; and
    an application program operated by said portable computing device, said application program adapted to determine a quantity of a plurality of items to be picked from or put to a physical location and illuminate a number of individual lamps on one of said strips at a particular location on one of said shelves, the number of individual lamps illuminated being equal to the quantity of the plurality of items to be picked from or put to the physical location,
    and said application program adapted to cause said computing device to selectively illuminate the number of lamps in a group of lamps defining a physical location on a shelf corresponding to a portion of that shelf that requires the pick or put, wherein said application program is configured to cause said computing device to selectively illuminate lamps in a manner that adjustably positions a first lamp in said group of lamps at an edge of the physical location.

11. The pick or put cart as claimed in claim 10 wherein different groups of lamps are illuminated in different colors.

12. The pick or put cart as claimed in claim 1 wherein said application program is adapted to illuminate lamps in either a flashing mode or an alternate color mode, to indicate a special handling mode and wherein a basis for the special handling mode is displayed by the portable computing device.

13. The pick or put cart as claimed in claim 12 wherein the special handling mode comprises at least one chosen from hazardous material, material being picked or put as part of a random quality control audit, gift wrapping required and need to obtain an access code for use with an electronic device requiring the access code.

14. The pick or put cart as claimed in claim 1 wherein said portable computing device comprises at least one chosen from a smart phone, a laptop computer and a tablet computer.

15. The pick or put cart as claimed in claim 10 wherein said lamp strips are light emitting diode strips and wherein the light emitting diodes in a strip are individually addressable.

16. A method of picking items from an inventory area or putting items to an inventory area, said method comprising:
    moving a frame having transport members in an inventory area, said frame defining a plurality of vertically spaced shelves, said frame having an electronic system comprising a portable computing device and a plurality of lamp strips, one of said lamp strips mounted to each of said shelves, each of said lamp strips comprising a plurality of individual lamps immovably fixed in spaced arrangement to said lamp strip;

an application program operated by said portable computing device, said application program determining a quantity of a plurality of items to be picked from or put to a physical location and causing said computing device to illuminate a number of individual lamps on one of said strips at a particular location on one of said shelves, the number of individual lamps illuminated being equal to the quantity of the plurality of items to be picked from or put to the physical location; and selectively illuminating, with the computing device, the number of individual lamps in a group of lamps defining the physical location on the shelf that requires the pick or put, said selectively illuminating the group of lamps is performed in a manner to adjustably position a first lamp in the group of lamps at an edge of the physical location.

17. The method as claimed in claim 16 wherein said adjustable groups of lamps are configured to vary at least one chosen from spacing and size of receptacles located at said shelves.

18. The method as claimed in claim 16 wherein said application program causes said portable computing device to illuminate different groups of lamps in different colors.

19. The method as claimed in claim 16 wherein said application program causes said portable computing device to illuminate lamps in either a flashing mode or an alternate color mode, to indicate a special handling mode and causes a basis for the special handling mode to be displayed by the portable computing device.

20. The method as claimed in claim 19 wherein the special handling mode comprises at least one chosen from hazardous material, material being picked or put as part of a random quality control audit, gift wrapping required and need to obtain an access code for use with an electronic device requiring the access code.

21. A method of picking items from an inventory area or putting items to an inventory area, said method comprising:

moving a frame having transport members in an inventory area, said frame defining a plurality of vertically spaced shelves, said frame having an electronic system comprising a portable computing device and a plurality of lamp strips, one of said lamp strips mounted to each of said shelves, each of said lamp strips comprising a plurality of individual lamps immovably fixed in spaced arrangement to said lamp strip;

determining, with an application program operated by said portable computing device, a quantity of a plurality of items to be picked from or put to a physical location on one of said shelves;

illuminating, with said computing device, a number of individual lamps on one of said strips at the physical location that requires the pick or put in a manner that defines at least a portion of the physical location, the number of individual lamps illuminated being equal to the quantity of the plurality of items to be picked from or put to the physical location;

picking items from or putting items to the physical location; and extinguishing, with said computing device, the same number of lamps as the quantity of items picked from or put to the physical location such that remaining illuminated lamps are equal to the quantity of items remaining to be picked from or put to the physical location.

\* \* \* \* \*